(12) United States Patent
Nakamura

(10) Patent No.: US 8,575,854 B2
(45) Date of Patent: Nov. 5, 2013

(54) POWER CONVERSION APPARATUS, DISCHARGE LAMP BALLAST AND HEADLIGHT BALLAST

(75) Inventor: Toshiaki Nakamura, Kadoma (JP)

(73) Assignee: Panasonic Corporation, Kadoma-shi (JP)

( * ) Notice: Subject to any disclaimer, the term of this patent is extended or adjusted under 35 U.S.C. 154(b) by 485 days.

(21) Appl. No.: 12/736,575

(22) PCT Filed: Aug. 29, 2008

(86) PCT No.: PCT/JP2008/065535
§ 371 (c)(1),
(2), (4) Date: Oct. 20, 2010

(87) PCT Pub. No.: WO2009/130808
PCT Pub. Date: Oct. 29, 2009

(65) Prior Publication Data
US 2011/0037416 A1    Feb. 17, 2011

(30) Foreign Application Priority Data
Apr. 24, 2008  (JP) ................................ 2008-114602

(51) Int. Cl.
*H05B 37/02* (2006.01)
*H02M 3/335* (2006.01)

(52) U.S. Cl.
USPC ................................. 315/291; 315/76; 315/77

(58) Field of Classification Search
USPC ......... 315/247, 246, 224, 185, 291, 307–311; 363/21.12; 323/344, 345
See application file for complete search history.

(56) References Cited

U.S. PATENT DOCUMENTS

| 5,729,443 A | 3/1998 | Pavlin |
| 5,939,837 A * | 8/1999 | Canova .......................... 315/247 |
| 6,288,501 B1 | 9/2001 | Nakamura et al. |
| 7,161,308 B2 * | 1/2007 | Kanno et al. ................... 315/291 |
| 7,453,216 B2 * | 11/2008 | Ushijima ................... 315/209 R |
| 2004/0155639 A1 | 8/2004 | Mobers |

(Continued)

FOREIGN PATENT DOCUMENTS

| JP | 63-099767 A | 5/1988 |
| JP | 3-195362 B2 | 8/1991 |

(Continued)

OTHER PUBLICATIONS

International Search Report dated Nov. 25, 2008, issued for PCT/JP2008/065535.

(Continued)

*Primary Examiner* — Douglas W Owens
*Assistant Examiner* — Devan A Clark
(74) *Attorney, Agent, or Firm* — Edwards Wildman Palmer LLP

(57) ABSTRACT

Power conversion apparatus includes a converter circuit, a control circuit, a simulation circuit and a sense circuit. The converter circuit includes a magnetic device for power conversion and a switching device, and is configured to convert power from a power supply into direct current power. The control circuit is configured to supply the converter circuit with a high frequency signal for turning the switching device on and off. The simulation circuit is configured to produce a simulation signal that simulates state or change of magnetic flux of the magnetic device. The sense circuit is configured to produce a signal which corresponds to at least one of the input and output of the converter circuit and is superposed on the simulation signal to form a superposed signal. The control circuit defines an on-period of the high frequency signal based on the superposed signal.

18 Claims, 11 Drawing Sheets

(56) References Cited

U.S. PATENT DOCUMENTS

| | | |
|---|---|---|
| 2004/0183507 A1 | 9/2004 | Amei |
| 2005/0275626 A1* | 12/2005 | Mueller et al. ............. 345/156 |
| 2007/0040516 A1* | 2/2007 | Chen ........................... 315/291 |
| 2007/0139027 A1 | 6/2007 | Nishimori |
| 2008/0197786 A1* | 8/2008 | Schaible et al. ............ 315/224 |
| 2009/0267517 A1 | 10/2009 | Tanaka et al. |

FOREIGN PATENT DOCUMENTS

| | | |
|---|---|---|
| JP | 04-322159 A | 11/1992 |
| JP | 08-182314 A | 7/1996 |
| JP | 2000-340385 A | 12/2000 |
| JP | 2004-087339 A | 3/2004 |
| JP | 2004-282962 A | 10/2004 |
| JP | 2004-531199 | 10/2004 |
| JP | 2007-174772 A | 7/2007 |
| WO | WO-2008013164 A1 | 1/2008 |

OTHER PUBLICATIONS

Japanese Examination Report issued Aug. 7, 2012 for corresponding Application No. 2008-114602.

* cited by examiner

POWER CONVERSION APPARATUS, DISCHARGE LAMP BALLAST AND HEADLIGHT BALLAST

TECHNICAL FIELD

The invention relates generally to power conversion apparatus, and more particularly to power conversion apparatus comprising a magnetic element for power conversion, a discharge lamp ballast comprising the power conversion apparatus and a headlight (headlamp) ballast comprising the power conversion apparatus.

BACKGROUND ART

Japanese Patent Application Publication No. 2000-340385 describes a ballast for a discharge lamp (e.g., a high intensity discharge (HID) lamp). The ballast (hereinafter referred to as a "first prior art") includes a DC-DC converter circuit, an inverter circuit, a start circuit and an output control circuit, and is especially characterized by the DC-DC converter circuit and the output control circuit.

The DC-DC converter circuit is a flyback converter configured to convert voltage from a DC (direct current) power supply into specified voltage, and has a transformer with primary and secondary windings, a switching device, a diode and a capacitor. The primary winding has first and second ends, and the first end of the primary winding is connected with a positive terminal of the DC power supply. The switching device is connected between the second end of the primary winding and a negative terminal of the DC power supply. The secondary winding has first and second ends, and the first end of the secondary winding is connected with an anode of the diode. The capacitor has first and second ends that are connected with a cathode of the diode and the second end of the secondary winding, respectively. The polarity of the second end of the secondary winding is the same as that of the first end of the primary winding.

The output control circuit is configured to turn the switching device on and off by either a critical mode or a continuous mode.

In the critical mode, the switching device is turned on when a secondary current through the secondary winding side reaches zero, and is turned off when a primary current through the primary winding side reaches a command value for a primary peak current. The command value for the primary peak current is made from a current command value and an output current of the DC-DC converter circuit. The current command value is evaluated from the output voltage of the DC-DC converter circuit, namely the voltage across the capacitor.

In the continuous mode, even if the secondary current is larger than zero, the switching device is turned on when an off-period of the switching device exceeds a maximum off-period. In high intensity discharges, if lamp temperature is low, an inclination of a secondary current (with respect to a temporal axis) becomes gentle by decrease in lamp voltage, and an off-period until the secondary current reaches zero becomes long. Accordingly, a switching frequency of a switching device is reduced and a peak value of a primary current for obtaining a specified output is increased, which causes increase in peak current of the switching device, a large scaled transformer and a large scaled capacitor. Especially, the influence is increased when high intensity discharges are used for a vehicle, because if lamp temperature is low, it is necessary to provide the lamp with excess electric power in comparison with a steady state in order to quickly increase a light output. By the continuous mode, the switching frequency can be prevented from be excessively decreased.

The zero point of a secondary current can be detected directly and indirectly. However, a primary current needs to be compared with the command value for the primary peak current, and accordingly requires to be detected by a signal corresponding to an actual primary current.

A primary current is detected through a resistor in general. For example, in Japanese Patent Application Publication No. H8-182314, an electric current through a primary winding is detected through a current sensor that is a resistor. However, if the resistor is used as the current sensor, power loss occurs. In highly-loaded electric power and low input voltage in particular, an electric current through a switching device is increased, and accordingly a resistor of large size must be used as the current sensor. If a low resistor is used as the current sensor, power loss can be reduced, but a sensor signal is reduced and is easily affected by disturbance (noise).

A discharge lamp ballast (hereinafter referred to as a "second prior art") described in Japanese Patent Application Publication No. 2004-87339 can solve the problem of the current sensor. The second prior art includes a DC-DC converter circuit configured like the first prior art, and is configured to turn an and off a switching device of the DC-DC converter circuit based on a signal (voltage) value from a sawtooth oscillator and a command value. Specifically, the command value is a PWM command value, and produced in response to output voltage and output current of the DC-DC converter circuit. The switching device of the DC-DC converter circuit is turned on if the signal value from the sawtooth oscillator is smaller than the command value, and is otherwise turned off. In short, the second prior art does not need a current sensor for detecting an electric current through a primary side of the DC-DC converter circuit. In addition, the output of the sawtooth oscillator can be raised, and the influence of disturbance can be further reduced.

However, in a continuous mode of the second prior art, if input voltage or load voltage fluctuates slightly or the off timing of the switching device is slightly shifted by noise or the like, the output power can be fluctuated greatly. Specifically, when the switching device is turned off, if the output power increases slightly, an inclination of an electric current through the secondary winding becomes large. When the switching device is then turned on, an initial value of an electric current through the primary winding is reduced. An on-period of the switching device is not immediately changed by delay in output detection, delay in feedback control and so on. Therefore, when the switching device is turned off, a peak value of an electric current through the primary winding is reduced. The output power of the DC-DC converter circuit is proportional to the square of a peak current through the primary winding, and accordingly slightly shifted peak current has a great influence on the output power. In addition, in a discharge lamp having a negative resistance characteristic, the lamp voltage is increased in response to the decrease of the output. Thereby, the output voltage of the DC-DC converter circuit is further increased, and the output is decreased. Similarly, increase in output causes great fluctuation.

On the other hand, in the first prior art, even if input and output of the DC-DC converter circuit are changed suddenly, the command value for the primary peak current is unchanged. For this reason, the first prior art has few influence on output power, and even if the response of feedback control is slow, it fits in a small output fluctuation range. Therefore, the first prior art has a high output power stability in comparison with the second prior art.

Since the second prior art has no current sensor, the output power requires to be adjusted based on output voltage and output current of the DC-DC converter circuit. Therefore, if the feedback control is slow, output fluctuation is increased. For this reason, if the gain of the feedback control is increased, the response speed can be increased, but the feedback control stability becomes impaired. In order to avoid increase in allowable current of the switching device and saturation of the transformer, an overcurrent protective device is necessary in place of a current sensor.

DISCLOSURE OF THE INVENTION

It is an object of the present invention to suppress output fluctuation in a continuous mode in particular while securing the feedback control stability based on a simulation signal obtained from state or change of magnetic flux of a magnetic device.

Power conversion apparatus of the present invention comprises a converter circuit and a control circuit. The converter circuit comprises a magnetic device for power conversion and a switching device. The converter circuit is also configured: (a) to supply the magnetic device with an electric current from a power supply to store energy in the magnetic device when the switching device is turned on in accordance with a high frequency signal; (b) to discharge the energy stored in the magnetic device when the switching device is turned off in accordance with the high frequency signal; (c) and thereby to convert power from the power supply into direct current power. The control circuit is configured to supply the high frequency signal to the converter circuit. According to an aspect of the invention, the power conversion apparatus further comprises a simulation circuit and a sense circuit. The simulation circuit is configured to produce a simulation signal which simulates state or change of magnetic flux of the magnetic device. The sense circuit is configured to produce a signal which corresponds to at least one of input and output of the converter circuit and is superposed on the simulation signal to form a superposed signal. The control circuit defines an on-period of the high frequency signal based on the superposed signal.

In the invention, it is possible to suppress output fluctuation in a continuous mode in particular while securing the feedback control stability based on a simulation signal obtained from state or change of magnetic flux of the magnetic device.

In an embodiment, the signal produced through the sense circuit corresponds to the DC component of magnetic flux of the magnetic device.

In an embodiment, when the input or the output of the converter circuit increases, the inclination polarity of fluctuation added to the signal produced through the sense circuit is the same as the inclination polarity of the simulation signal in an enlargement period of magnetic flux of the magnetic device (i.e., on-period of the switching device). For example, when the signal produced through the sense circuit (detection signal) is an output signal of the converter circuit, there are some combinations. In case each of the output signal and the simulation signal is a positive signal, if the output signal is increased by load fluctuation in an enlargement period of the superposed signal, the detection signal (output signal) is further increased and accordingly the superposed signal is further increased, because the inclination polarity of fluctuation added to the detection signal by the load fluctuation is the same as the inclination polarity of the simulation signal in an enlargement period of magnetic flux of the magnetic device. As a result, an on-period of the switching device becomes short, and the output of the converter circuit is prevented from increasing. Similarly, in case the output and simulation signals are negative and positive signals, respectively if the output signal is increased by load fluctuation in an enlargement period of magnetic flux of the magnetic device, the superposed signal is further increased. As a result, an on-period of the switching device becomes short, and the output of the converter circuit is prevented from increasing. In case the output and simulation signals are positive and negative signals, respectively and the inclination polarity of the simulation signal in an enlargement period of magnetic flux of the magnetic device is negative, if the power conversion apparatus is configured to have a negative inclination when the output signal is increased by load fluctuation, it is possible to suppress the output fluctuation of the converter circuit. When the output of the converter circuit is increased by load fluctuation, the enlargement period is extremely shorter than an on-period of the switching device. Also, when the input of the converter circuit increases, there are some combinations like the aforementioned combinations.

In an embodiment, the control circuit is configured to compare the superposed signal with a command signal and to turn the switching device off if the level of the superposed signal exceeds the level of the command signal. The magnetic device comprises a winding. The simulation circuit comprises a capacitor which is charged and discharged by a signal from all or part of the winding. The superposed signal is produced by superposing the signal corresponding to at least one of the input and the output of the converter circuit on voltage across the capacitor or voltage corresponding to the voltage across the capacitor.

In an embodiment, the control circuit is configured to compare the superposed signal with a command signal and to turn the switching device off if the level of the superposed signal exceeds the level of the command signal. The magnetic device comprises a winding. The simulation circuit comprises a capacitor which is charged and discharged by a signal from all or part of the winding. The superposed signal is produced by combining an electric current signal with a charging current to the capacitor. The electric current signal is varied by the signal corresponding to at least one of the input and the output of the converter circuit.

In an embodiment, the signal produced through the sense circuit corresponds to at least one of input current, input power, output current, output voltage and output power of the converter circuit.

A discharge lamp ballast of the present invention comprises said power conversion apparatus and an inverter circuit configured to invert the direct current power from the power conversion apparatus into alternating current power.

A headlight ballast of the present invention comprises the discharge lamp ballast and a headlight body having a headlight enclosure in which a discharge lamp and a lamp socket are included. The discharge lamp ballast is configured to supply the alternating current power to the discharge lamp through the socket.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

Basic Configuration

Figure 1:
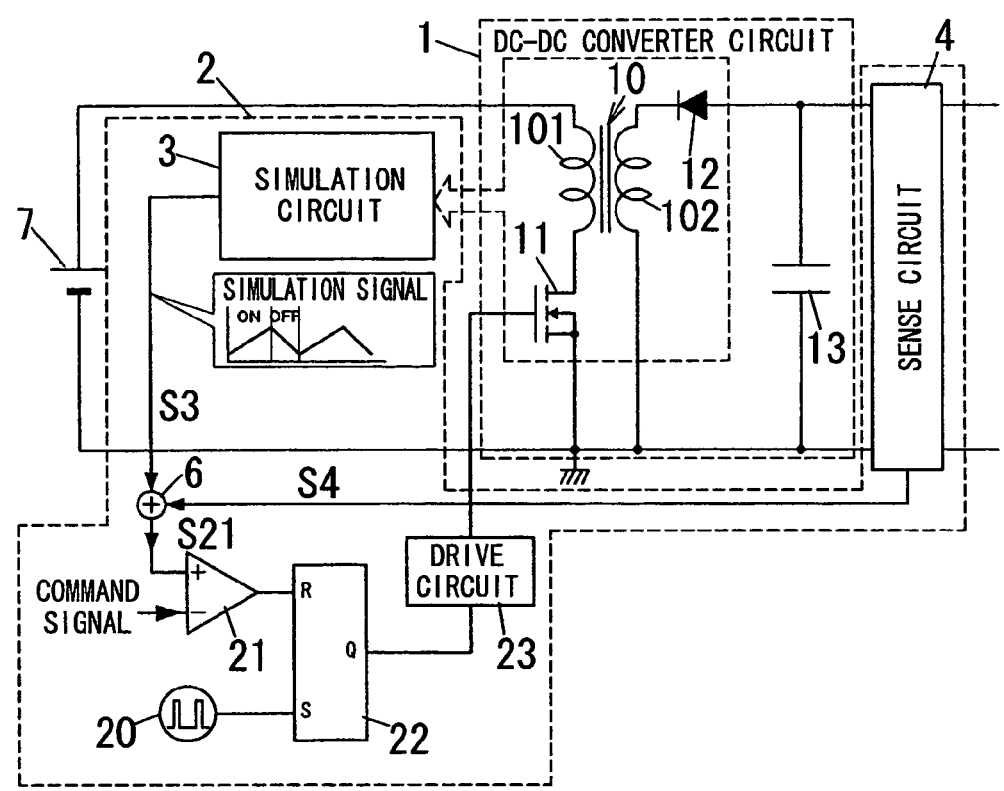
FIG. 1 illustrates a basic configuration of power conversion apparatus in accordance with the present invention.

FIG. 1 shows a basic configuration of power conversion apparatus in accordance with the present invention. The power conversion apparatus includes a DC-DC converter circuit 1 and a control circuit 2, and can be incorporated into, for example, a discharge lamp ballast, a headlight ballast, or the like in the same way as the first prior art. Each of the ballasts is further provided with an inverter circuit, a start circuit, a discharge lamp and so on. Like the first prior art, the inverter circuit may be formed of a full bridge inverter circuit for converting output voltage (DC voltage) of the DC-DC converter circuit 1 into alternating-current voltage, and a drive circuit for four switching devices in the full bridge inverter circuit. The start circuit may be configured to receives output voltage of the inverter circuit to generate a high voltage pulse for starting the discharge lamp. The discharge lamp may be, for example, a high intensity discharge lamp. However, not limited to this, the load may be a light-emitting diode(s) or the like. The configuration of each of them is well known to those skilled in the art and is not further described in detail herein.

The DC-DC converter circuit 1 includes a magnetic device for power conversion and a switching device, and is configured to store and discharge energy. That is, the circuit 1 stores energy in the magnetic device by supplying the magnetic device with an electric current from a power supply when the switching device is turned on in accordance with a high frequency signal. The circuit 1 also discharges the energy stored in the magnetic device when the switching device is turned off in accordance with the high frequency signal. In the example of FIG. 1, the circuit 1 has a transformer 10 with primary and secondary windings 101 and 102, a switching device 11, a diode 12 and a capacitor 13, and is configured to convert voltage from a DC (direct current) power supply 7 into specified voltage. The primary winding 101 has first and second ends, and the first end of the primary winding 101 is connected with a positive terminal of the DC power supply 7. The switching device is connected between the second end of the primary winding 101 and a negative terminal of the DC power supply 7. The secondary winding 102 has first and second ends, and the first end of the secondary winding 102 is connected with the cathode of the diode 12. The capacitor 13 has first and second ends that are connected with the anode of the diode 12 and the second end of the secondary winding 102, respectively. However, not limited to the configuration of FIG. 1, the DC-DC converter circuit 1 may be a chopper circuit, a composite circuit of a chopper circuit and an inverter circuit, or the like.

The control circuit 2 is configured to supply a high frequency signal to a control terminal (a gate) of the switching device 11 in the DC-DC converter circuit 1. Specifically, the control circuit 2 has an oscillator 20, a comparator 21, an RS flip-flop 22, a drive circuit 23, a simulation circuit 3, a sense circuit 4 and an adder circuit 6, and is characterized by the simulation circuit 3 and the sense circuit 4.

The set input "S" and the reset input "R" of the RS flip-flop 22 are connected with the output of the oscillator 20 and the output of the comparator 21, respectively. The output "Q" of the RS flip-flop 22 is connected with the control terminal of the switching device 11 through the drive circuit 23. In an example, the switching cycle of the switching device 11 may be adjusted in response to input and output conditions of the DC-DC converter circuit 1. The on timing of the switching device 11 may be decided by the energy stored in the magnetic device. For example, the switching device 11 may be turned on in response to the magnetic flux of zero.

The simulation circuit 3 is configured to produce a simulation signal S3 which approximately simulates state or change of magnetic flux of the magnetic device (transformer 10). The sense circuit 4 is configured to produce a signal (in FIG. 1, "S4") which corresponds to at least one of the input and the output of the DC-DC converter circuit 1 (in FIG. 1, the output) and is superposed on the simulation signal S3 through the adder circuit 6 to form a superposed signal S21. The polarity of the signal S4 is set so that the inclination polarity of the signal S4 when the magnetic flux is increased agrees with the inclination polarity of the output when the output is increased by, for example, load fluctuation. The superposed signal S21 is supplied to the non-inverting input of the comparator 21. A command signal of on-period is also supplied to the inverting input of the comparator 21. The command signal is a signal for determining the off timing of the switching device 11 (on-period).

In the basic configuration, the output of the DC-DC converter circuit 1 can be controlled by adjusting the on-period of the switching device 11 by the superposed signal S21. Moreover, the superposed signal S21 is obtained from the signals S3 and S4, and therefore it is unnecessary to directly detect an electric current through a magnetic device such as a transformer, an inductor or the like.

The inventors of the present invention has filed an associated technology, namely Japanese Patent Application No. 2007-238563 entitled "Power Conversion Apparatus" on Sep. 13, 2007.

Figure 2:
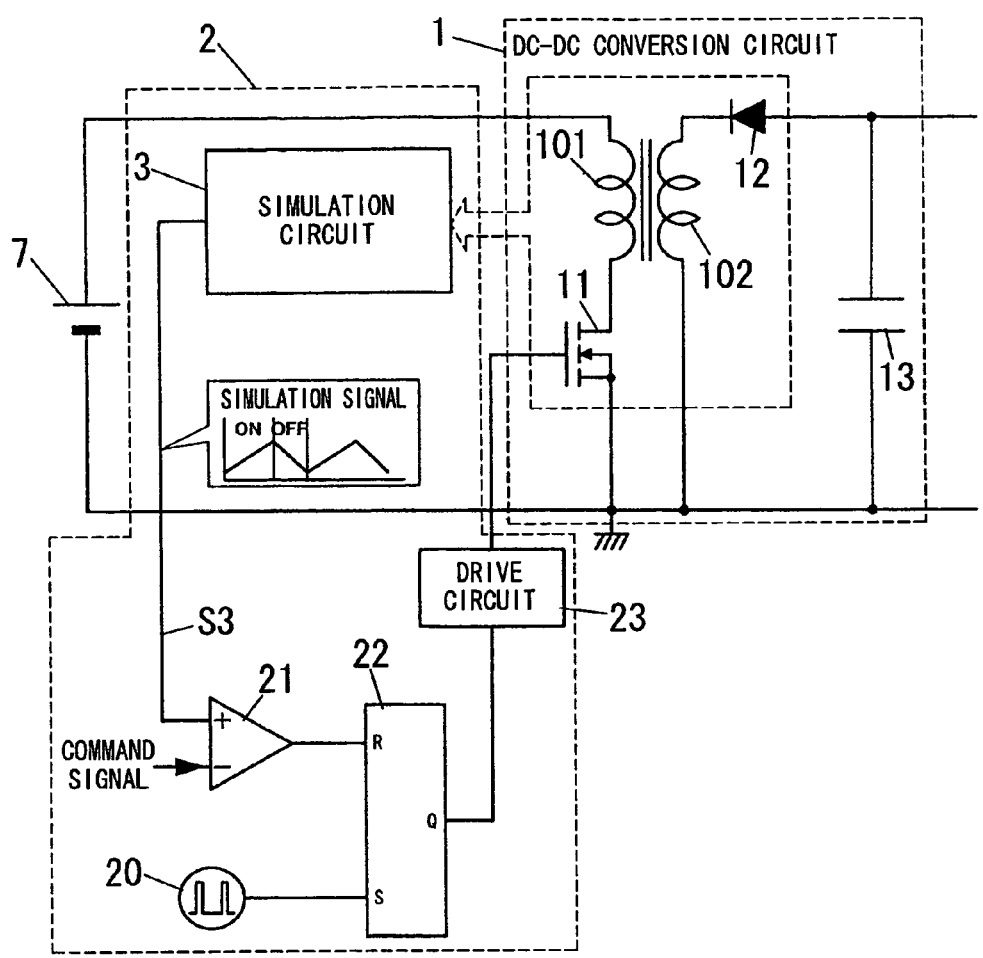
FIG. 2 is a schematic diagram of an associated technology, namely Japanese Patent Application No. 2007-238563 entitled "Power Conversion Apparatus" on Sep. 13, 2007.

FIG. 2 is a schematic diagram of the associated technology. The associated technology includes a DC-DC converter circuit 1 and a control circuit 2. The DC-DC converter circuit 1 of the associated technology is configured like that of the basic configuration. On the other hand, the control circuit 2 of the associated technology has an oscillator 20, a comparator 21, an RS flip-flop 22, a drive circuit 23 and a simulation circuit 3 like the basic configuration, but does not have circuits corresponding to the sense circuit 4 and the adder circuit 5. That is, the only simulation signal S3 is supplied to the non-inverting input of the comparator 21, and the on-period of the switching device 11 is defined.

Figure 3:
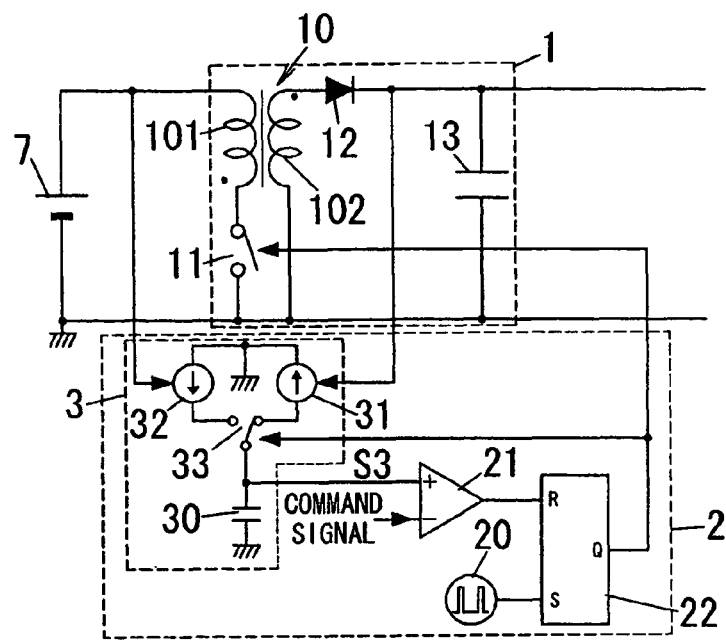
FIG. 3 illustrates an example of the associated technology.

FIG. 3 shows an example of the associated technology. In FIG. 3, the simulation circuit 3 of the associated technology is formed of a capacitor 30, a current signal source 31 for discharging the capacitor 30, a current signal source 32 for charging the capacitor 30, and a switch 33 for connecting one of the current signal sources 31 and 32 to the capacitor 30. The switch 33 is controlled in synchronization with the switching frequency of the switching device 11. That is, the switch 33 is controlled by a switching signal from the output "Q" of the RS flip-flop 22. Specifically, if the switching device 11 is turned on, the capacitor 30 is connected with the current signal source 32 to be charged. If the switching device 11 is turned off, the capacitor 30 is connected with the current signal source 31 to be discharged. In short, the simulation signal S3 is the voltage across the capacitor 30 that corresponds to the temporal integration of an electric current by the current signal sources 31 and 32.

The operation of the associated technology is explained. If the oscillator 20 supplies a signal for turning the switching device 11 on to the set input "S" of the RS flip-flop 22, the output "Q" of the RS flip-flop 22 becomes High. As a result, the switching device 11 is turned on through the drive circuit 23 (not shown), while at the same time the capacitor 30 is connected with the current signal source 32 to be discharged. The comparator 21 subsequently compares the simulation signal S3 obtained from the capacitor 30 with a command signal of on-period, and supplies a signal for turning the switching device 11 off to the reset input "R" of the RS flip-flop 22 if the level of the signal S3 exceeds the level of the command signal. Thereby, the output "Q" of the RS flip-flop 22 becomes Low. The switching device 11 is consequently turned off through the drive circuit 23, while at the same time the capacitor 30 is connected with the current signal source 31 to be discharged.

In the associated technology, a simulation signal is produced by temporal integration of the voltage of the magnetic device, and the switching device 11 is turned off by the simulation signal. Accordingly, a current sensor for detecting an electric current through the primary winding is unnecessary. The voltage of the magnetic device may be detected directly, or may be indirectly detected from the input voltage and the output voltage of the DC-DC converter circuit 1, the switching state of the switching device and so on. Since a current sensor is unnecessary, a large resistor is unnecessary and power loss can be avoided. It is also possible to enhance the output stability of the DC-DC converter circuit 1.

Figure 4:
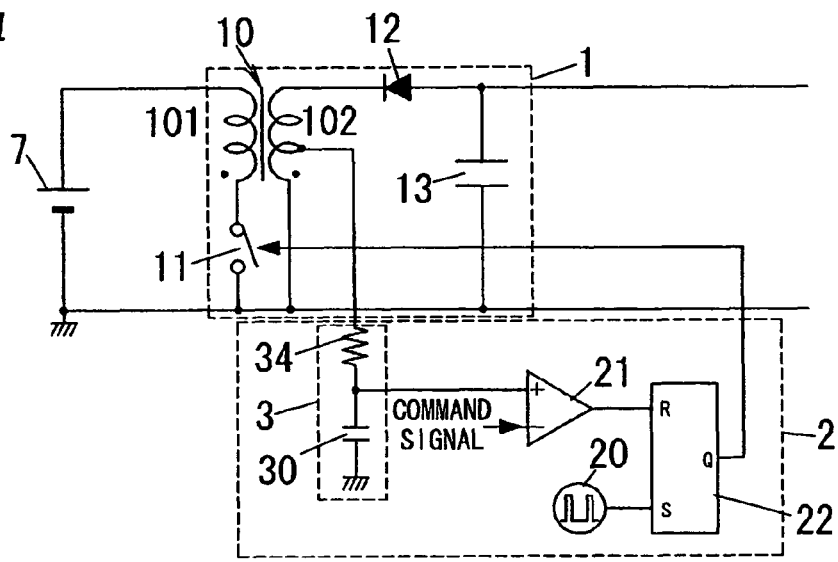
FIG. 4 illustrates another example of the associated technology.

FIG. 4 shows another example of the associated technology. In FIG. 4, a simulation circuit 3 of the associated technology is formed of a capacitor 30 and a resistor 34 (a low-pass filter). The capacitor 30 is charged and discharged by voltage of the secondary winding 102.

Figure 5:
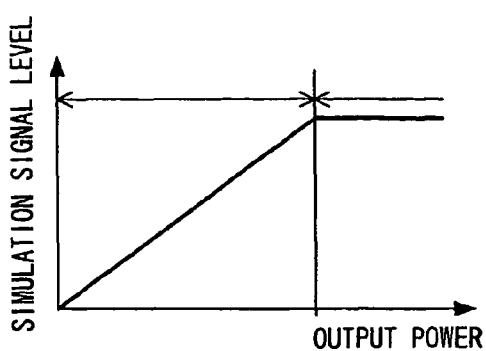
FIG. 5 is an explanatory diagram of a problem of the associated technology.

However, in the associated technology, the DC component of magnetic flux of the magnetic device does not appear in the simulation signal. Accordingly, in a continuous mode, if the voltage across the capacitor 30 reaches a predetermined voltage, the output power of the DC-DC converter circuit 1 becomes constant as shown in FIG. 5. In this instance, the level of the simulation signal cannot exceed the level of a command signal of on-period, and accordingly the off timing of the switching device 11 cannot be defined. Instantaneous fluctuation of magnetic flux appears in a simulation signal even in a continuous mode, and accordingly it is possible to follow instantaneous output fluctuation. However, detection of actual output and feedback control is required with respect to average fluctuation of magnetic flux, and the gain of the feedback control requires to be raised owing to high-speed response. As a result, stability becomes impaired.

In the basic configuration of FIG. 1, a signal S4 can be regarded as the DC component of magnetic flux of the magnetic device, and the signal S4 is superposed on a simulation signal S3. Accordingly, since the simulation signal is increased in response to increase in output voltage of the DC-DC converter circuit 1 even in a continuous mode, the level of the simulation signal can exceed the level of a command signal of on-period. If a simulation circuit 3 is formed of an integrating circuit, a low-pass filter or the like, the amplitude of a simulation signal can be enlarged by adjusting each device parameter of the simulation circuit 3 and influence of disturbance can be reduced.

Figure 6:
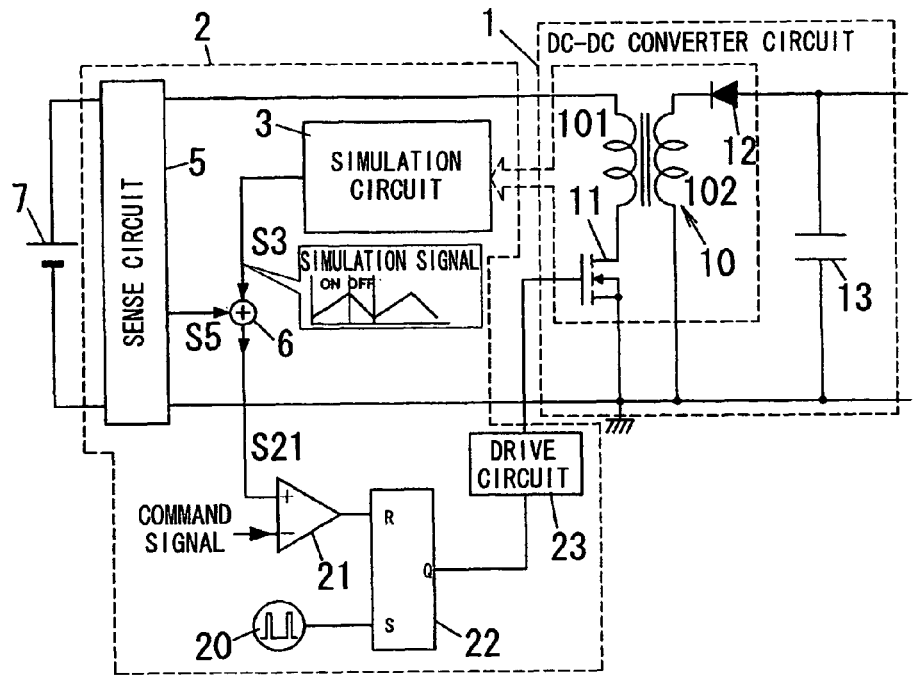
FIG. 6 illustrates another basic configuration of power conversion apparatus in accordance with the present invention.

FIG. 6 shows another basic configuration of power conversion apparatus in accordance with the present invention. In the basic configuration of FIG. 6, the sense circuit 4 is replaced with a sense circuit 5. The sense circuit 5 is configured to produce a signal "S5" which corresponds to the input of the DC-DC converter circuit 1 and is superposed on a simulation signal S3 through the adder circuit 6 to form a superposed signal S21.

In an example, a signal corresponding to at least one of electric power, voltage and an electric current with respect to the magnetic device is used as a signal S4 or S5. When a discharge lamp ballast or a headlight ballast includes power conversion apparatus of FIG. 1 or 6 and a high intensity discharge lamp is used, it is desirable that a signal corresponding to an electric current through the magnetic device is used as a signal S4 or S5, because fluctuation of lamp voltage is gentle, while fluctuation of a lamp current is large.

First Embodiment

Figure 7:
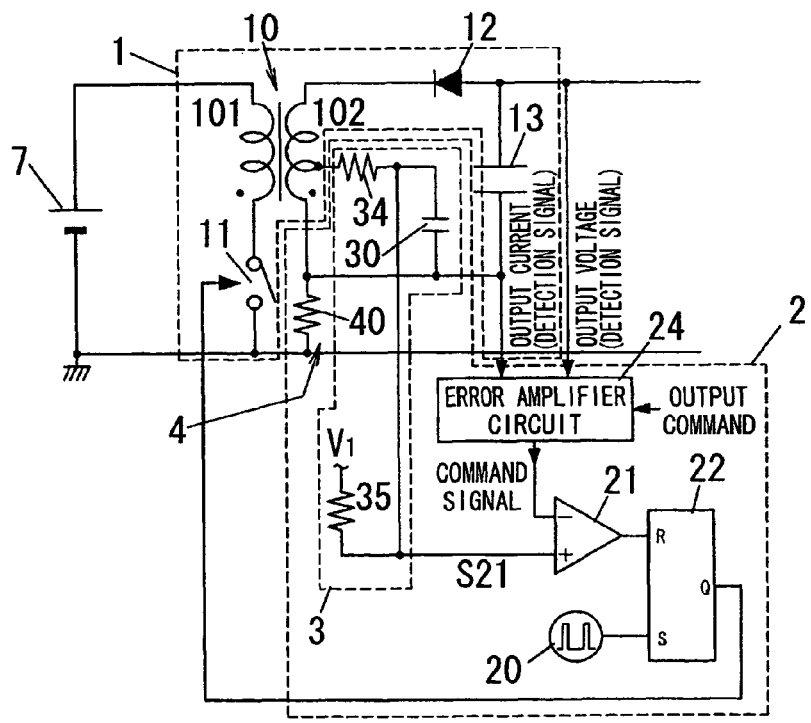
FIG. 7 is a schematic diagram of power conversion apparatus in accordance with a first embodiment of the present invention.

FIG. 7 shows power conversion apparatus in accordance with a first embodiment of the present invention. The power conversion apparatus in the first embodiment has the basic configuration of FIG. 1 and further includes an error amplifier circuit 24. For the purpose of clarity, like kind elements are assigned the same reference numerals as depicted in FIG. 1.

The error amplifier circuit 24 is configured, according to an output command from the outside, to detect output voltage and output current of the DC-DC converter circuit 1 to produce a command signal of on-period by error calculation of the output voltage and output current. The output voltage of the DC-DC converter circuit 1 is detected from the junction of the diode 12 and the capacitor 13, for example, through a voltage divider (not shown). The output current of the DC-DC converter circuit 1 is obtained from a sense circuit 4 to be hereinafter described. The command signal is supplied to the inverting input of the comparator 21.

In an aspect of the first embodiment, the simulation circuit 3 has resistors 34 and 35 and a capacitor 30, and is configured to charge and discharge the capacitor 30 by voltage of the secondary winding 102 obtained via the resistor 34. The secondary winding 102 also has an intermediate tap in addition to first and second ends, and the polarity of the second end of the secondary winding 102 is the same as that of the second end of the primary winding 101. Specifically, the resistor 34 and the capacitor 30 constitute a low-pass filter. The resistor 34 has first and second ends and the first end of the resistor 34 is connected with the intermediate tap of the secondary winding 102. The capacitor 30 has first and second ends that are connected with the second end of the resistor 34 and the second end of the secondary winding 102, respectively. The junction of the resistor 34 and the capacitor 30 is also connected with the non-inverting input of the comparator 21. Therefore, part of voltage across the secondary winding 102 is applied across the capacitor 30 through the resistor 34. Accordingly, allowable voltage of each device of the low-pass filter can be lowered. However, not limited to this, all of voltage across the secondary winding 102 may be applied to the capacitor 30 through the resistor 34.

In order to prevent voltage across the capacitor 30 from shifting to negative potential by the output voltage (negative voltage) of the DC-DC converter circuit 1, the resistor 35 is connected between the junction of the resistor 34 and the capacitor 30 and a reference voltage supply ($V_1$). That is, offset voltage is applied to the capacitor 30.

The sense circuit 4 is configured to produce a signal which corresponds to the output (output current) of the DC-DC converter circuit 1 and is superposed on a simulation signal at the junction of the secondary winding 102 and the sense circuit 4 to form a superposed signal S21. In the example of FIG. 7, the circuit 4 has a resistor 40 connected between the second end of the secondary winding 102 and the negative terminal of the DC power supply 7. The junction of the secondary winding 102 and the resistor 40 corresponds to the adder circuit 6 of FIG. 1.

The relationship between the voltage across the capacitor 30 and magnetic flux of the transformer 10 is explained. The magnetic flux $\Phi$ of the transformer 10 is given by $$\Phi = (1/N_2) \cdot \int V_2 dt,$$

where $N_2$ is the winding number of the secondary winding 102 and $V_2$ is voltage of the secondary winding 102. Therefore, the magnetic flux $\Phi$ of the transformer 10 can be simulated by temporal integration of the voltage of the secondary winding 102.

Since fluctuation of input and output voltage during a switching cycle is small, the magnetic flux $\Phi$ can be approximated by $$\Phi = V_2 \cdot t / N_2,$$

where t is time. That is, the magnetic flux $\Phi$ of the transformer 10 is proportional to the product of voltage of the secondary winding 102 and time.

If on-period and off-period of the switching device 11 is smaller than a time constant of the low-pass filter, the fluctuation of voltage across the capacitor 30 ($\Delta V$) is given by $$\Delta V = k \cdot V_2 \cdot t / (R_T \cdot C_T),$$

where k is a positive value less than one, $C_T$ is an electric capacity of the capacitor 30 and $R_T$ is a resistance value of the resistor 34. For example, the on-period and off-period is equal to or less than one fifth of the time constant.

The fluctuation of voltage $\Delta V$ is proportional to the product of voltage of the secondary winding 102 and time like the approximate expression of the magnetic flux $\Phi$. Accordingly, the voltage of the capacitor 30 can be used as a simulation signal which simulates state or change of magnetic flux of the magnetic device (transformer 10).

The operation of the first embodiment is explained. If the oscillator 20 supplies a signal for turning the switching device 11 on to the set input "S" of the RS flip-flop 22, the output "Q" of the RS flip-flop 22 becomes High (turn-on signal). The switching device 11 is consequently turned on through the drive circuit 23 (not shown).

If the switching device 11 is turned on, the magnetic flux of the transformer 10 increases and also the capacitor 30 is charged to generate a simulation signal. Electrical potential of the first end of the capacitor 30 increases with respect to electrical potential of the second end, and accordingly the simulation signal becomes a voltage signal having a positive inclination with respect to a temporal axis. An electric current also flows through the second end (positive terminal) of the capacitor 13, the resistor 40, an external circuit (e.g., inverter circuit) and the first end (negative terminal) of the capacitor 13, and accordingly positive voltage is generated across the resistor 40. Therefore, the signal of the resistor 40, namely the sense circuit 4 corresponds to the output (output current) of the DC-DC converter circuit 1. The signal of the resistor 40 is superposed on a simulation signal, and thereby a superposition signal S21 is produced. The superposition signal S21 is supplied to the non-inverting input of the comparator 21 to be compared with a command signal of on-period supplied to the inverting input of the comparator 21. The level of the superposition signal S21 subsequently exceeds the level of the command signal and then the comparator 21 supplies a signal (reset signal) for turning the switching device 11 off to the reset input "R" of the RS flip-flop 22. Thereby, the output "Q" of the RS flip-flop 22 becomes low (turn-off signal), so that the switching device 11 is turned off through the drive circuit 23. In the enlargement period of the superposed signal S21, when the output of the DC-DC converter circuit 1 is increased by, for example, load fluctuation, the signal polarity of the resistor 40 is additive polarity with respect to the polarity of the simulation signal. Specifically, the inclination polarity of fluctuation added to a signal of the sense circuit 4 is the same as the inclination polarity of a simulation signal and each of them is positive. As a result, the on-period of the switching device 11 becomes short and the output of the DC-DC converter circuit 1 is prevented from increasing.

If the switching device 11 is turned off, the secondary winding 102 generates negative voltage. The capacitor 13 is charged, and the capacitor 30 is also discharged. Accordingly, the voltage across the capacitor 30 is reduced and the capacitor 30 generates a simulation signal. The simulation signal has a negative inclination corresponding to output voltage of the DC-DC converter circuit 1 (the negative voltage generated across the secondary winding when the switching device is turned off). An output current of the DC-DC converter circuit 1 also flows through the resistor 40, and the resistor 40 generates positive voltage. Accordingly, a signal corresponding to the output of the DC-DC converter circuit 1 is superposed on the simulation signal, so that a superposed signal S21 is produced. The oscillator 20 subsequently supplies a signal for turning the switching device 11 on to the set input "S" of the RS flip-flop 22, and then the output "Q" of the RS flip-flop 22 becomes High, and the switching device 11 is turned on, and the same operations are repeated.

In the first embodiment, a signal (output signal) of the sense circuit 4 (resistor 40) is employed as the DC component of magnetic flux of the transformer 10. Accordingly, in a continuous mode, even if a simulation signal is a signal that the DC component of the magnetic flux is cut, the on and off timing of the switching device 11 can be adjusted in response to an electric current through the transformer 10. Thereby, it is possible to enhance the stability of output voltage of the DC-DC converter circuit 1. Since the level of a simulation signal can be increased by adjusting an electric capacity of the capacitor 30 or the like, the influence of disturbance can be reduced.

Figure 8:
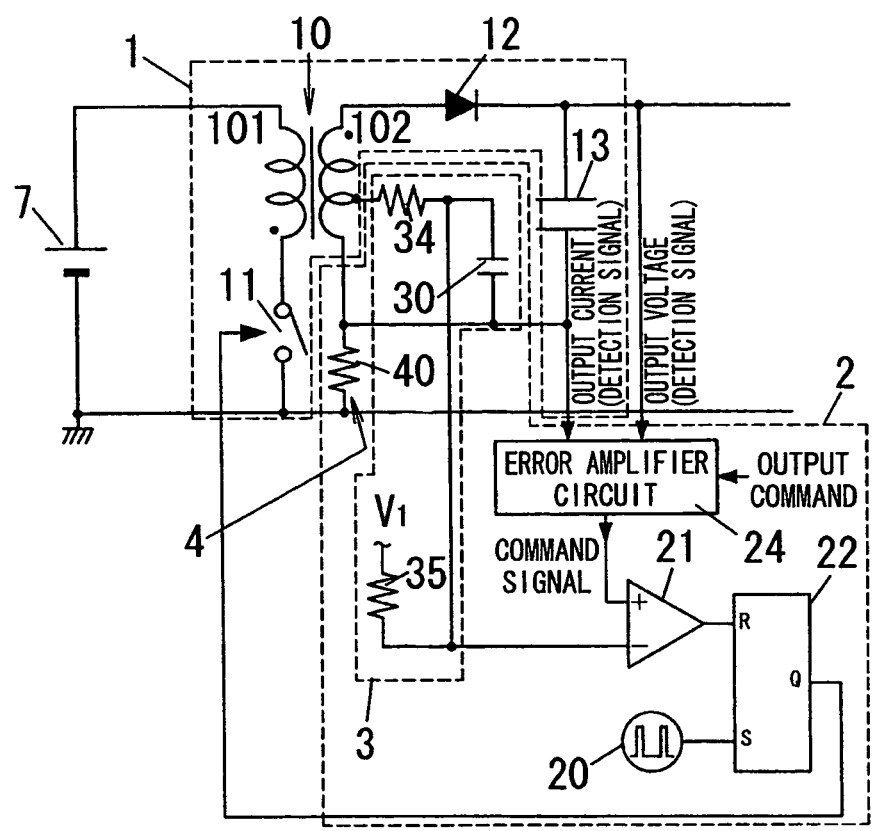
FIG. 8 illustrates an alternate example of the power conversion apparatus.

In an alternate example, as shown in FIG. 8, the power conversion apparatus is configured to apply positive voltage to an external circuit (e.g., an inverter circuit), and polarity of each signal in secondary side is the reverse of that of a corresponding signal of the first embodiment. That is, the polarity of the first end of the secondary winding 102 is the same as that of the second end of the primary winding 101, and the anode and cathode of the diode 12 are connected with the first end of the secondary winding 102 and the first end of the capacitor 13, respectively. In this example, if the level of a superposed signal is lower than the level of a command signal of on-period, the comparator 21 supplies a signal (reset signal) for turning the switching device 11 off to the reset input "R" of the RS flip-flop 22. The signal of the resistor 40 is also negative voltage. In an on-period of the switching device 11, when the output of the DC-DC converter circuit 1 is increased by, for example, load fluctuation, the polarity of a signal of the resistor 40 is additive polarity with respect to the polarity of a simulation signal. Specifically, the inclination polarity of fluctuation added to a signal of the resistor 40 is the same as the inclination polarity of a simulation signal in enlargement period of magnetic flux, and each of them is negative. Therefore, the operation and effect like first embodiment are obtained. Thus, the present invention can be applied to a plurality of combinations (see "DISCLOSURE OF THE INVENTION").

Second Embodiment

Figure 9:
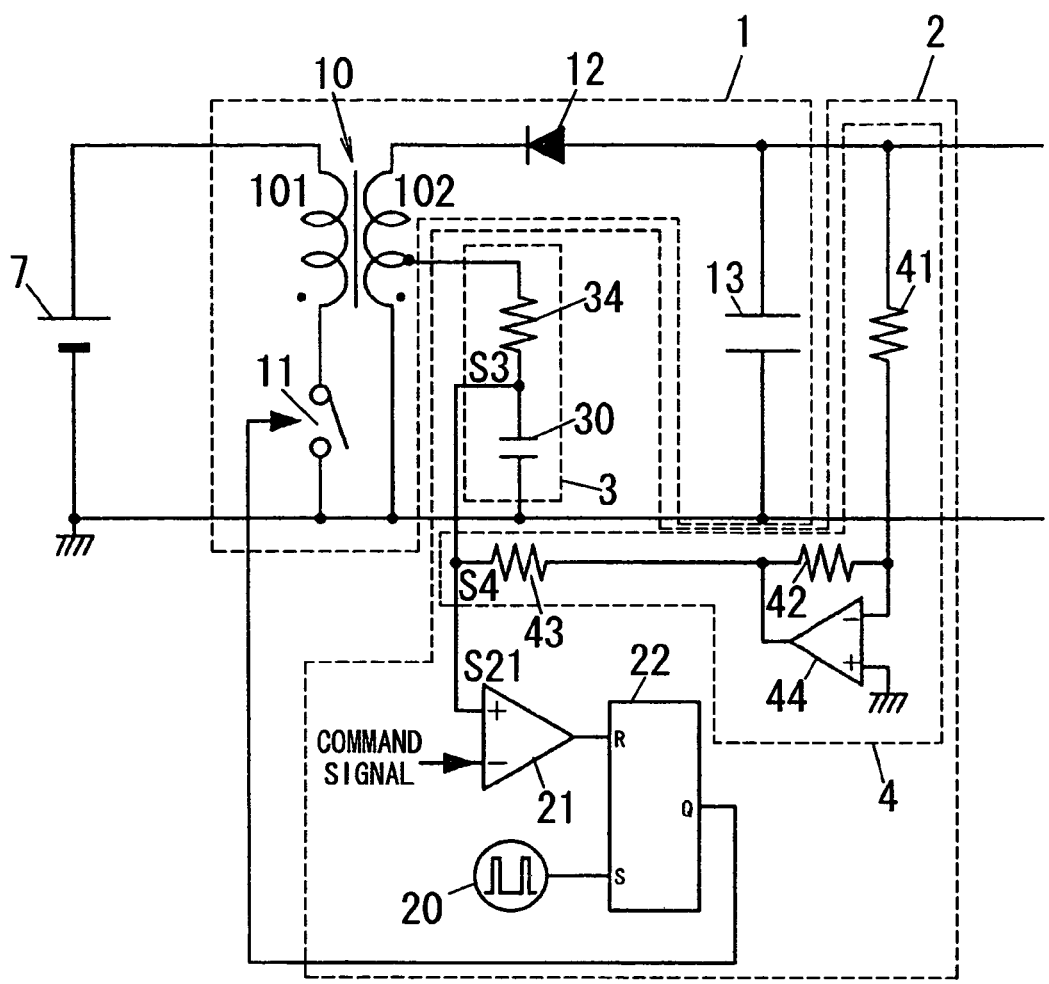
FIG. 9 is a schematic diagram of power conversion apparatus in accordance with a second embodiment of the present invention.

FIG. 9 shows power conversion apparatus in accordance with a second embodiment of the present invention. The power conversion apparatus in the second embodiment has the basic configuration of FIG. 1. For the purpose of clarity, like kind elements are assigned the same reference numerals as depicted in FIGS. 1 and 7.

The power conversion apparatus of the second embodiment is characterized by a sense circuit 4 different from that of the first embodiment. That is, the circuit 4 is configured to produce a signal S4 which corresponds to the output (output voltage) of the DC-DC converter circuit 1 and is superposed on a simulation signal S3 at the junction of the resistor 34 and the capacitor 30 to form a superposed signal S21. Since the output of the DC-DC converter circuit 1 is negative voltage, the sense circuit 1 has, but not limited to, resistors 41-43 and an operational amplifier 44 that constitute an inverting amplifier. The resistor 41 has first and second ends, and the first end of the resistor 41 is connected with the junction of the diode 12 and the capacitor 13. The second end of the resistor 41 is also connected with the inverting input of the operational amplifier 44. The resistor 42 has first and second ends that are connected with the inverting input and output of the operational amplifier 44, respectively. The resistor 42 has first and second ends, and the first end of the resistor 42 is connected with the output of the operational amplifier 44. The second end of the resistor 42 is also connected with the junction of the resistor 34 and the capacitor 30. The junction of the resistor 34 and the capacitor 30 corresponds to the adder circuit 6 in FIG. 1, and a superposition ratio of a signal S4 to a simulation signal S3 is defined by a voltage divider ratio of the resistors 34 and 43.

In the second embodiment, a signal (output voltage) of the sense circuit 4 is employed as the DC component of magnetic flux of the transformer 10. Accordingly, in a continuous mode, even if a simulation signal is a signal that the DC component of the magnetic flux is cut, the on and off timing of the switching device 11 can be adjusted in response to an electric current through the transformer 10.

Figure 10:
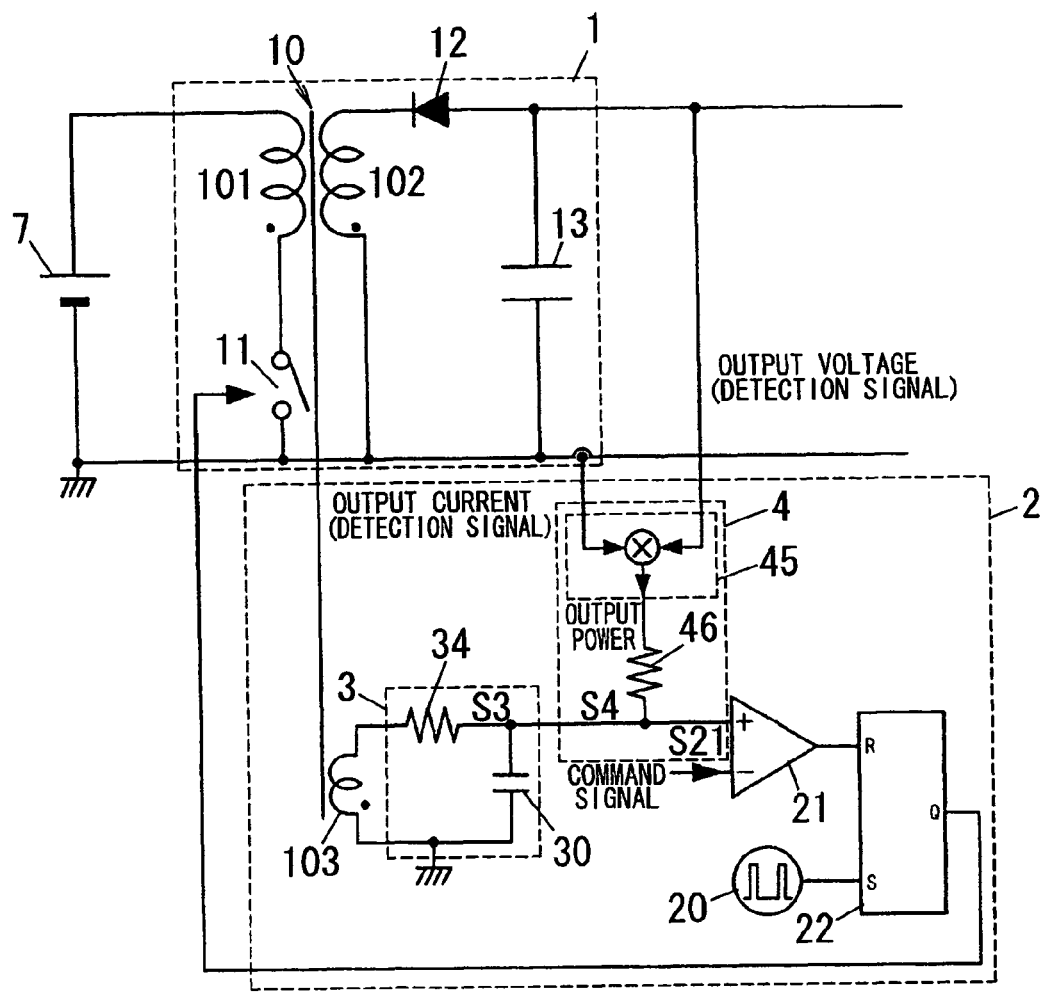
FIG. 10 is a schematic diagram of power conversion apparatus in accordance with a third embodiment of the present invention.

In an example, the sense circuit produces an electric current signal in response to the output voltage of the DC-DC-converter circuit 1, and the electric current signal is superposed on the superposed signal S3. A superposition ratio of the electric current signal to the simulation signal S3 is determined by a conversion coefficient from the output voltage to the electric current signal and a resistance value of the resistor 34. In the present invention, as shown in FIGS. 9 and 10 (see below), a superposed signal may be produced by combining an electric current signal with a charging current to the capacitor 30. The electric current signal is varied by a signal corresponding to at least one of the input and output of the DC-DC converter circuit 1.

In an example, the power conversion apparatus is used for a ballast for a discharge lamp(s) having a negative resistance characteristic. In an on-period of the switching device 11, when the output of the DC-DC converter circuit 1 is increased by, for example, load fluctuation, the polarity of a signal of the sense circuit is subtractive polarity (reverse polarity) with respect to the polarity of a simulation signal. In the example of FIG. 9, the inverting amplifier is replaced with a non-inverting amplifier. In a load such as a discharge lamp having a negative resistance characteristic, the output more increases as the output voltage more decreases.

Third Embodiment

FIG. 10 shows power conversion apparatus in accordance with a third embodiment of the present invention. The power conversion apparatus in the third embodiment has the basic configuration of FIG. 1. For the purpose of clarity, like kind elements are assigned the same reference numerals as depicted in FIGS. 1 and 7.

The power conversion apparatus in the third embodiment is characterized by a sense circuit 4 different from the first embodiment's one. The transformer 10 also has an auxiliary winding 103 at the secondary side in addition to primary and secondary windings 101 and 102. The auxiliary winding 103 has first and second ends, and the polarity of the second end of the auxiliary winding 103 is the same as that of each second end of the primary and secondary windings 101 and 102. The first and second ends of the auxiliary winding 103 are connected with the first end of the resistor 34 and the second end of the capacitor 30, respectively.

The sense circuit 4 in the third embodiment is configured to produce a signal S4 which corresponds to the output (output power) of the DC-DC converter circuit 1 and is superposed on a simulation signal S3 at the junction of the resistor 34 and the capacitor 30 to form a superposed signal S21. For example, the sense circuit 4 has an arithmetic circuit 45 and a resistor 46. The arithmetic circuit 45 is configured to calculate output power of the DC-DC converter circuit 1 from output voltage and output current of the DC-DC converter circuit 1. The output voltage of the DC-DC converter circuit 1 is detected through, for example, a voltage divider (not shown) from the junction of the diode 12 and the capacitor 13. The output current of the DC-DC converter circuit 1 is obtained from a low resistor (see, e.g., the resistor 40 in FIG. 7). The superposition ratio of the signal S4 to the simulation signal S3 is defined by a voltage divider ratio of the resistors 34 and 46.

In the third embodiment, a signal of the sense circuit 4 (output power) is employed as the DC component of magnetic flux of the transformer 10. Accordingly, in a continuous mode, even if a simulation signal is a signal that the DC component of the magnetic flux is cut, the on and off timing of the switching device 11 can be adjusted in response to an electric current through the transformer 10.

Fourth Embodiment

Figure 11:
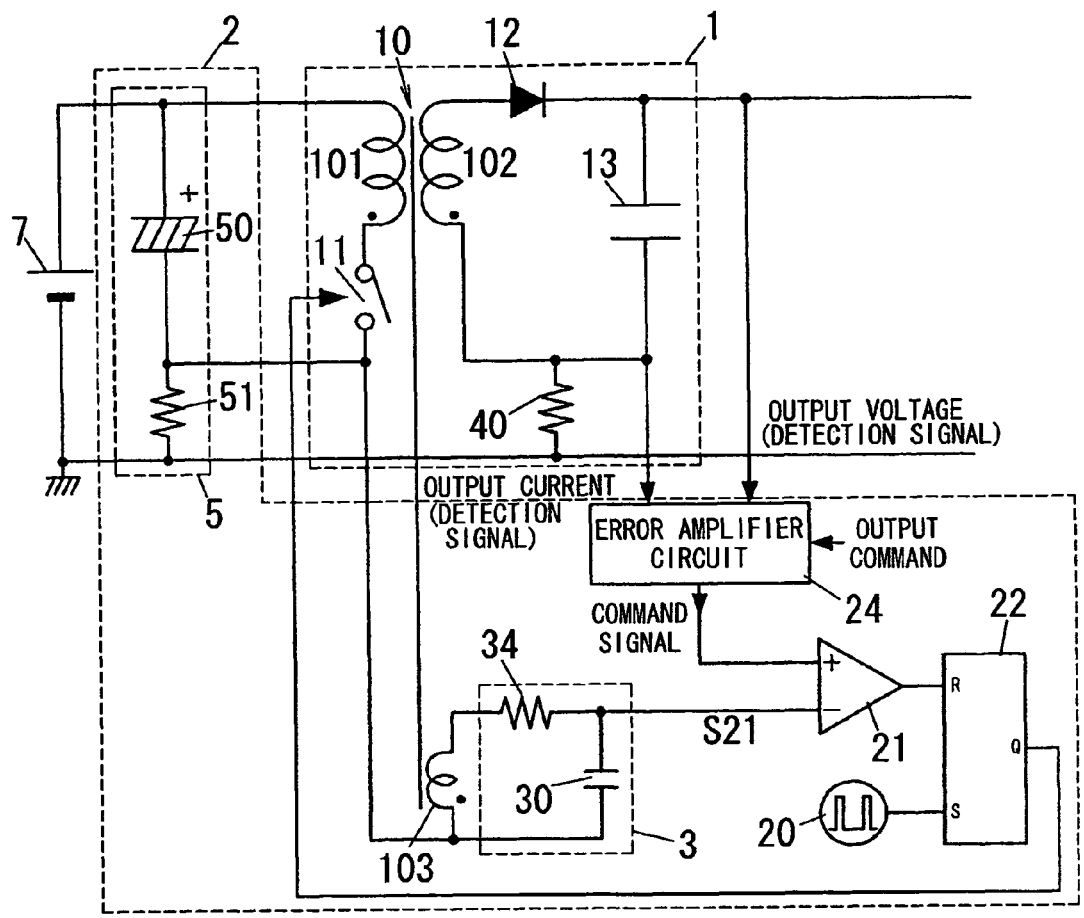
FIG. 11 is a schematic diagram of power conversion apparatus in accordance with a fourth embodiment of the present invention.

FIG. 11 shows power conversion apparatus in accordance with a fourth embodiment of the present invention. The power conversion apparatus in the fourth embodiment has the basic configuration of FIG. 6, and further includes an error amplifier circuit 24. The transformer 10 also has an auxiliary winding 103 at the secondary side in addition to primary and secondary windings 101 and 102 like the third embodiment. For the purpose of clarity, like kind elements are assigned the same reference numerals as depicted in FIG. 6.

The auxiliary winding 103 has first and second ends that are connected with the first end of the resistor 34 and the second end of the capacitor 30, respectively. The polarity of the second end of the auxiliary winding 103 is the same as that of each second end of the primary and secondary windings 101 and 102.

The error amplifier circuit 24 is configured, according to an output command from the outside, to detect output voltage and output current of the DC-DC converter circuit 1 to produce a command signal of on-period by error calculation of the output voltage and output current. The output voltage of the DC-DC converter circuit 1 is detected from the junction of the diode 12 and the capacitor 13, for example, through a voltage divider (not shown). The output current of the DC-DC converter circuit 1 is obtained from the resistor 40 connected between the junction of the secondary winding 102 and the capacitor 13 and the negative terminal of the DC power supply 7. The negative terminal of the DC power supply 7 is connected with ground. The command signal is supplied to an inverting input of the comparator 21.

The power conversion apparatus in the fourth embodiment is characterized by a sense circuit 5. The sense circuit 5 is configured to produce a signal which corresponds to the input (input current) of the DC-DC converter circuit 1 and is superposed on a simulation signal at the second end of the auxiliary winding 103 to form a superposed signal S21. For example, the sense circuit 5 has a capacitor 50 and a resistor 51. The capacitor 50 is connected in parallel with a series combination of the primary winding 101 and the switching device 11. The resistor 51 has first and second ends, and the first end of the resistor 51 is connected with the junction of the capacitor 50 and the switching device 11. The second end of the resistor 51 is also connected with the negative terminal of the DC power supply 7.

In the fourth embodiment, the signal of the sense circuit 5 (input current) is employed as the DC component of magnetic flux of the transformer 10. Accordingly, in a continuous mode, even if a simulation signal is a signal that the DC component of the magnetic flux is cut, the on and off timing of the switching device 11 can be adjusted in response to an electric current through the transformer 10. Especially, in unloaded condition (zero output condition), overload can be prevented from occurring by voltage rise immediately after the DC-DC converter circuit 1 is activated.

In an example, the circuit impedance of a device for reverse polarity protection (e.g., switching device), an input filter or the like is replaced with the resistor 51.

Fifth Embodiment

Figure 12:
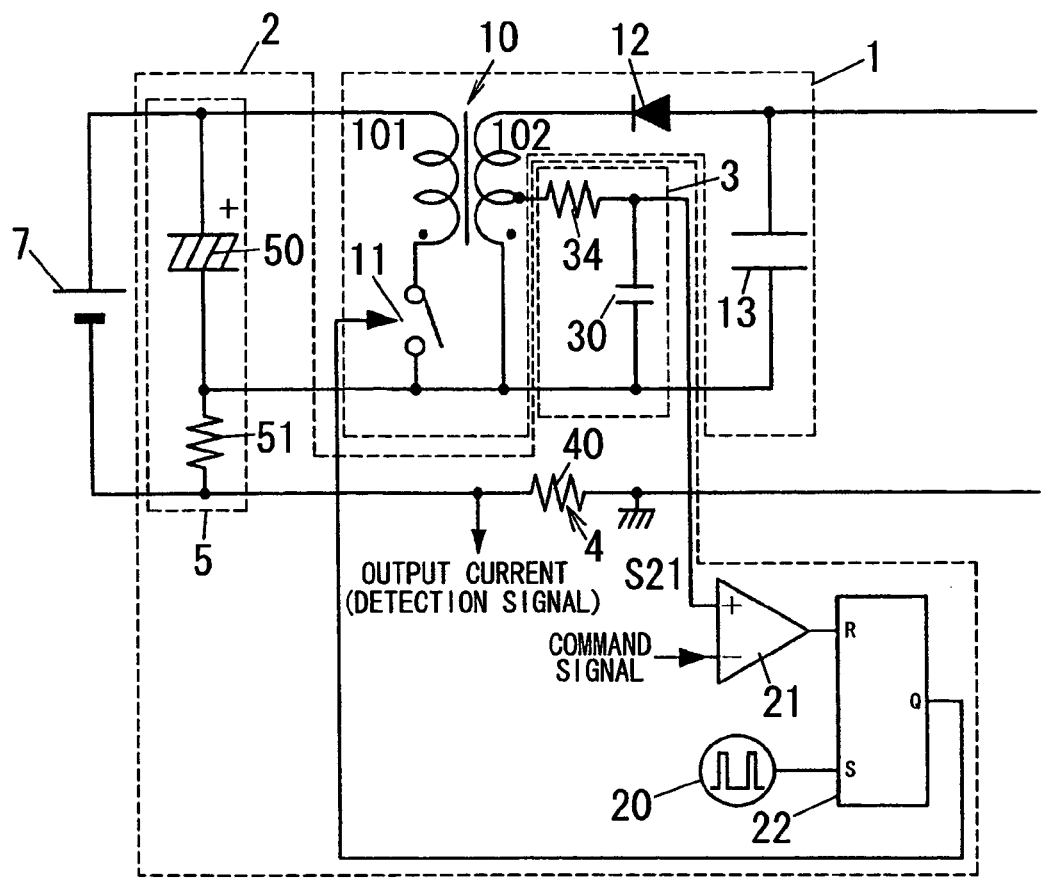
FIG. 12 is a schematic diagram of power conversion apparatus in accordance with a fifth embodiment of the present invention.

FIG. 12 shows power conversion apparatus in accordance with a fifth embodiment of the present invention. The power conversion apparatus in the fifth embodiment has the basic configuration of FIG. 6. For the purpose of clarity, like kind elements are assigned the same reference numerals as depicted in FIGS. 6 and 11. In FIG. 12, the "output current (detection signal)" is supplied to an error amplifier circuit for feedback control (not shown), and is used for production of a command signal for output control.

The transformer 10 has primary and secondary windings 101 and 102. The secondary winding 102 has an intermediate tap in addition to first and second ends. The resistor 34 has first and second ends, and the first end of the resistor 34 is connected with the intermediate tap of the secondary winding 102. The capacitor 30 has first and second ends that are connected with the second end of the resistor 34 and the second end of the secondary winding 102, respectively.

The power conversion apparatus in the fifth embodiment has sense circuits 4 and 5 that are configured to produce a signal which corresponds to input (input current) and output (output current) of the DC-DC converter circuit 1 and is superposed on a simulation signal at the second end of the capacitor 30 to form a superposed signal S21.

Specifically, the sense circuit 4 has a resistor 40. The resistor 40 has first and second ends that are connected with the negative terminal of the DC power supply 7 and ground, respectively. The first end of the capacitor 13 and ground constitute the output of the DC-DC converter circuit 1.

The sense circuit 5 has a capacitor 50 and a resistor 51. The capacitor 50 is connected in parallel with a series combination of the primary winding 101 and the switching device 11. The resistor 51 has first and second ends, and the first end of the resistor 51 is connected with the junction of the capacitor 50 and the switching device 11 and is also a connection part of low side of the DC-DC converter circuit 1. The second end of the resistor 51 is connected with the negative terminal of the DC power supply 7 and the first end of the resistor 40.

In the fourth embodiment, an input current is minute in output short-circuit condition, and accordingly DC component of magnetic flux superposed through the sense circuit 5 become insufficient. In the fifth embodiment, since the signal of the sense circuit 4 is also superposed on the simulation signal, it is possible to improve control performance in output short-circuit condition.

Sixth Embodiment

Figure 13:
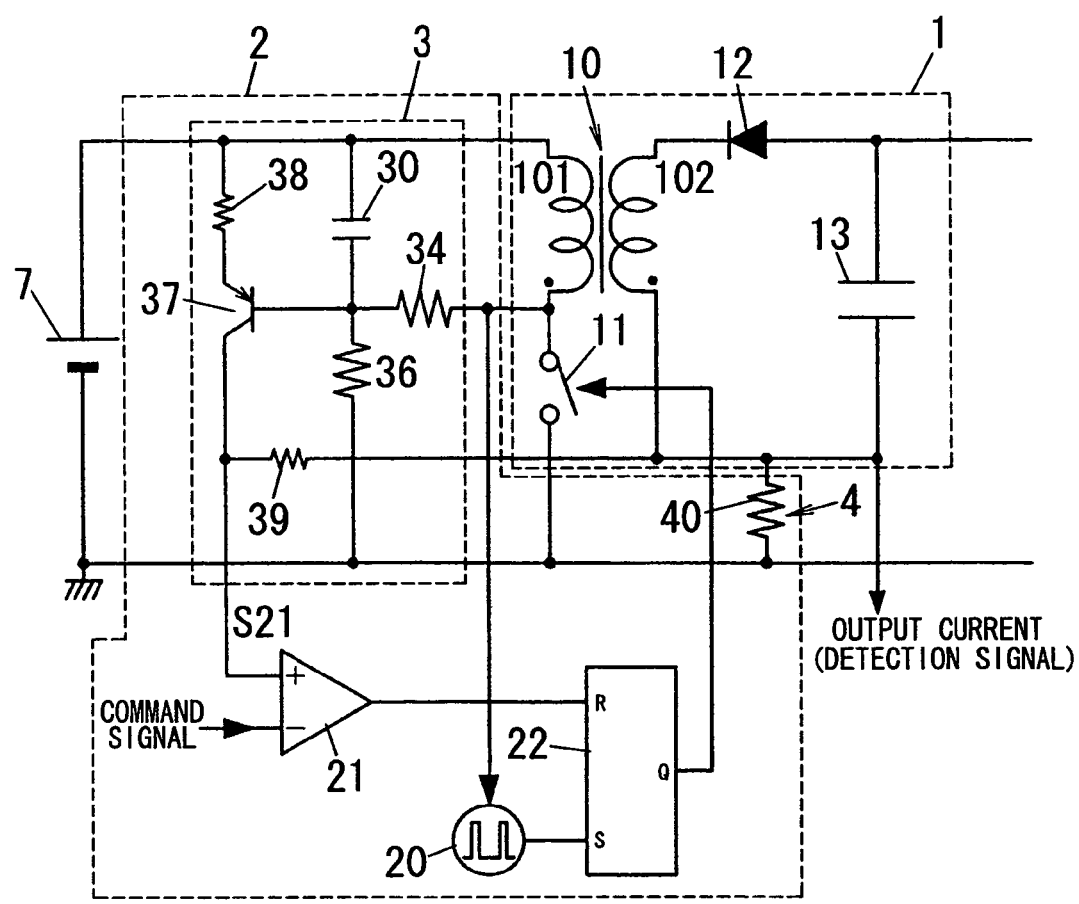
FIG. 13 is a schematic diagram of power conversion apparatus in accordance with a sixth embodiment of the present invention.

FIG. 13 shows power conversion apparatus in accordance with a sixth embodiment of the present invention. The power conversion apparatus in the sixth embodiment has the basic configuration of FIG. 1. For the purpose of clarity, like kind elements are assigned the same reference numerals as depicted in FIG. 1.

The polarity of the second end of the secondary winding 102 is the same as that of the second end of the primary winding 101. In FIG. 13, "output current (detection signal)" is supplied to an error amplifier circuit for feedback control (not shown), and is used for production of a command signal for output control.

The power conversion apparatus in the sixth embodiment is characterized by a simulation circuit 3 and a sense circuit 4. The simulation circuit 3 is formed of a capacitor 30, resistors 34, 36, 38 and 39, and a (PNP) transistor 37. The capacitor 30 has first and second ends, and the first end of the capacitor 30 is connected with the positive terminal of the DC power supply 7 and the first end of the primary winding 101. The resistor 34 has first and second ends that are connected with the second end of the capacitor 30 and the second end of the primary winding 101, respectively. The resistor 36 has first and second ends that are connected with the junction of the capacitor 30 and the resistor 34 and the negative terminal of the DC power supply 7, respectively. The resistor 38 has first and second ends, and the first end of the resistor 38 is connected with the junction of the DC power supply 7, the capacitor 30 and the primary winding 101. The emitter of the transistor 37 is connected with the second end of the resistor 38. The base of the transistor 37 is connected with the junction of the capacitor 30 and the resistors 34 and 36. The collector of the transistor 37 is connected with non-inverting terminal of the comparator 21. The transistor 37 and the resistor 38 constitute an emitter follower amplifier. The resistor 39 has first and second ends, and the first end of the resistor 39 is connected with the junction of the transistor 37 and the comparator. The second end of the resistor 39 is connected with the second end of the secondary winding 102.

In the simulation circuit 3, the capacitor 30 is charged and discharged by the voltage across the primary winding 101 via the resistor 34. The voltage across the capacitor 30 is converted into an electric current through the emitter follower amplifier. That is, the voltage across the capacitor 30 is applied to the resistor 38, and an electric current flows from the emitter of the transistor 37 to the collector in response to the voltage. The electric current (collector current) flows through the resistor 39, and thereby voltage (i.e., simulation signal) is generated across the resistor 39.

The sense circuit 4 is configured to produce a signal which corresponds to the output of the DC-DC converter circuit 1 (output current) and is superposed on the simulation signal at the junction of the resistor 39 and the secondary winding 102 to form a superposed signal S21. For example, the sense circuit 4 has a resistor 40 connected between the junction of the secondary winding 102 and the capacitor 13 and the negative terminal of the DC power supply 7.

In the sixth embodiment, the signal of the sense circuit 4 (input current) is employed as the DC component of magnetic flux of the transformer 10. Accordingly, in a continuous mode, even if a simulation signal is a signal that the DC component of the magnetic flux is cut, the on and off timing of the switching device 11 can be adjusted in response to an electric current through the transformer 10. Especially, in a discharge lamp ballast, the discharge lamp can be operated stably even when the DC-DC converter circuit 1 is working in the continuous mode.

Seventh Embodiment

Figure 14:
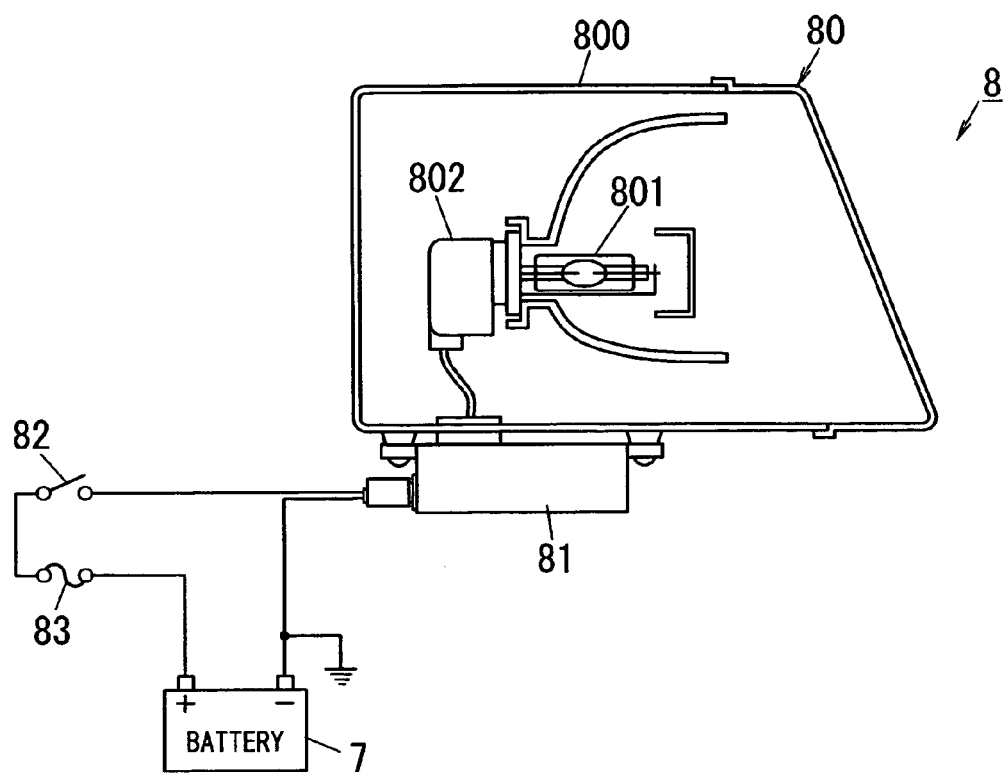
FIG. 14 is a schematic diagram of a headlight ballast in accordance with a seventh embodiment of the present invention.

FIG. 14 shows a headlight ballast 8 in accordance with a seventh embodiment of the present invention. The headlight ballast 8 has a headlight body 80, an electronic ballast 81 and so on. The headlight body 8 has a headlight enclosure 800 in which a discharge lamp (e.g., HID lamp) 801, a lamp socket 802 and son on are included. The discharge lamp 801 is connected with the electronic ballast 81 through the lamp socket 802. The electronic ballast 81 includes any power conversion apparatus of the first to sixth embodiments, an inverter, an igniter and so on, and is connected with a DC power supply (a battery in FIG. 8) through a switch 82 and a fuse 83.

If the discharge lamp 801 is cold when it is started, the lamp voltage is low. Accordingly, it is necessary to supply the lamp with excessive power as compared with steady state in order to promptly increase light output in a continuous mode. In the seventh embodiment, since a simulation signal increases in response to the output voltage of the DC-DC converter circuit 1 even in a continuous mode, the level of the simulation signal can exceed the level of a command signal of on-period.

Accordingly, even if the lamp voltage is low, the light output can be increased promptly in the continuous mode. Even if the ballast 81 is activated in a continuous mode in order to suppress excessive decrease of switching frequency under low input voltage owing to large fluctuation of battery voltage, output stability can be secured.

Although the present invention has been described with reference to certain preferred embodiments, numerous modifications and variations can be made by those skilled in the art without departing from the true spirit and scope of this invention.

The invention claimed is:

1. Power conversion apparatus, comprising:
   a converter circuit comprising a magnetic device for power conversion and a switching device, the converter circuit being configured: (a) to supply the magnetic device with an electric current from a power supply to store energy in the magnetic device when the switching device is turned on in accordance with a high frequency signal; (b) to discharge the energy stored in the magnetic device when the switching device is turned off in accordance with the high frequency signal; (c) and thereby to convert power from the power supply into direct current power; and
   a control circuit configured to supply the high frequency signal to the converter circuit,
   wherein the power conversion apparatus further comprises:
   a simulation circuit configured to produce a simulation signal which simulates state or change of magnetic flux of the magnetic device; and
   a sense circuit configured to produce a signal which corresponds to one of input or output of the converter circuit and is superposed on the simulation signal to form a superposed signal,
   wherein the control circuit defines an on-period of the high frequency signal based on the superposed signal.

2. The power conversion apparatus of claim 1, wherein the signal produced through the sense circuit corresponds to the DC component of magnetic flux of the magnetic device.

3. The power conversion apparatus of claim 1, wherein, when the input or the output of the converter circuit increases, inclination polarity of fluctuation added to the signal produced through the sense circuit is the same as inclination polarity of the simulation signal in an enlargement period of magnetic flux of the magnetic device.

4. The power conversion apparatus of claim 1,
   wherein the control circuit is configured to compare the superposed signal with a command signal, said control circuit being configured to turn the switching device off if the level of the superposed signal exceeds the level of the command signal,
   wherein the magnetic device comprises a winding,
   wherein the simulation circuit comprises a capacitor which is charged and discharged by a signal from all or part of the winding, and
   wherein the superposed signal is produced by superposing the signal corresponding to at least one of the input and the output of the converter circuit on voltage across the capacitor or voltage corresponding to the voltage across the capacitor.

5. The power conversion apparatus of claim 1,
   wherein the control circuit is configured to compare the superposed signal with a command signal, said control circuit being configured to turn the switching device off if the level of the superposed signal exceeds the level of the command signal,
   wherein the magnetic device comprises a winding, wherein the simulation circuit comprises a capacitor which is charged and discharged by a signal from all or part of the winding, and wherein the superposed signal is produced by combining an electric current signal with a charging current to the capacitor, said electric current signal being varied by the signal corresponding to at least one of the input and the output of the converter circuit.

6. The power conversion apparatus of claim 1, wherein the signal produced through the sense circuit corresponds to one of input current, input power, output current, output voltage or output power of the converter circuit.

7. A discharge lamp ballast, comprising:
power conversion apparatus of claim 1; and
an inverter circuit configured to invert the direct current power from the power conversion apparatus into alternating current power.

8. A headlight ballast, comprising:
the discharge lamp ballast of claim 7; and
a headlight body having a headlight enclosure in which a discharge lamp and a lamp socket are included,
wherein the discharge lamp ballast is configured to supply the alternating current power to the discharge lamp through the socket.

9. A discharge lamp ballast, comprising:
power conversion apparatus of claim 2; and
an inverter circuit configured to invert the direct current power from the power conversion apparatus into alternating current power.

10. A discharge lamp ballast, comprising:
power conversion apparatus of claim 3; and
an inverter circuit configured to invert the direct current power from the power conversion apparatus into alternating current power.

11. A discharge lamp ballast, comprising:
power conversion apparatus of claim 4; and
an inverter circuit configured to invert the direct current power from the power conversion apparatus into alternating current power.

12. A discharge lamp ballast, comprising:
power conversion apparatus of claim 5; and
an inverter circuit configured to invert the direct current power from the power conversion apparatus into alternating current power.

13. A discharge lamp ballast, comprising:
power conversion apparatus of claim 6; and
an inverter circuit configured to invert the direct current power from the power conversion apparatus into alternating current power.

14. A headlight ballast, comprising:
the discharge lamp ballast of claim 9; and
a headlight body having a headlight enclosure in which a discharge lamp and a lamp socket are included,
wherein the discharge lamp ballast is configured to supply the alternating current power to the discharge lamp through the socket.

15. A headlight ballast, comprising:
the discharge lamp ballast of claim 10; and
a headlight body having a headlight enclosure in which a discharge lamp and a lamp socket are included,
wherein the discharge lamp ballast is configured to supply the alternating current power to the discharge lamp through the socket.

16. A headlight ballast, comprising:
the discharge lamp ballast of claim 11; and
a headlight body having a headlight enclosure in which a discharge lamp and a lamp socket are included,
wherein the discharge lamp ballast is configured to supply the alternating current power to the discharge lamp through the socket.

17. A headlight ballast, comprising:
the discharge lamp ballast of claim 12; and
a headlight body having a headlight enclosure in which a discharge lamp and a lamp socket are included,
wherein the discharge lamp ballast is configured to supply the alternating current power to the discharge lamp through the socket.

18. A headlight ballast, comprising:
the discharge lamp ballast of claim 13; and
a headlight body having a headlight enclosure in which a discharge lamp and a lamp socket are included,
wherein the discharge lamp ballast is configured to supply the alternating current power to the discharge lamp through the socket.

* * * * *